(12) United States Patent
Nagaeda et al.

(10) Patent No.: US 7,565,040 B2
(45) Date of Patent: Jul. 21, 2009

(54) OPTICAL DEVICE USING VARIABLE POLARIZATION ELEMENT

(75) Inventors: Hiroshi Nagaeda, Hokkaido (JP); Noriyasu Shiga, Hokkaido (JP)

(73) Assignee: Trimatiz Limited, Chiba (JP)

( * ) Notice: Subject to any disclaimer, the term of this patent is extended or adjusted under 35 U.S.C. 154(b) by 0 days.

(21) Appl. No.: 11/596,277

(22) PCT Filed: May 16, 2005

(86) PCT No.: PCT/JP2005/008900

§ 371 (c)(1),
(2), (4) Date: Nov. 13, 2006

(87) PCT Pub. No.: WO2005/121876

PCT Pub. Date: Dec. 22, 2005

(65) Prior Publication Data

US 2007/0291346 A1    Dec. 20, 2007

(30) Foreign Application Priority Data

May 28, 2004  (JP) .............................. 2004-187078

(51) Int. Cl.
*G02B 6/00* (2006.01)
(52) U.S. Cl. .......................................... 385/11; 385/14
(58) Field of Classification Search ...................... 385/1, 385/3, 4, 14, 16, 18, 20, 28, 50, 122, 132, 385/11

See application file for complete search history.

(56) References Cited

U.S. PATENT DOCUMENTS 4,687,291 A * 8/1987 Stape et al. .................... 385/59
4,712,864 A * 12/1987 Ellis et al. ..................... 385/59
4,903,402 A * 2/1990 Norton et al. ................. 29/843

(Continued)

FOREIGN PATENT DOCUMENTS

JP   8-510564   11/1966

(Continued)

OTHER PUBLICATIONS

Y. Yoshida et al., "PLZT Light Shutter," Ceramics, vol. 26, No. 2, pp. 139-143 (1991).

*Primary Examiner*—James P Hughes
*Assistant Examiner*—Peter Radkowski
(74) *Attorney, Agent, or Firm*—Finnegan, Henderson, Farabow, Garrett & Dunner, LLP (57) ABSTRACT

An optical device using an electro-optical element is of great utility value to industry, owing to its fast responsiveness and the like. Prior art has problems such as high cost due to a large number of parts, large device size, and high drive voltage, and it has been a challenge to reduce the number of parts to be used, to downsize the device, and to reduce drive voltage. An optical device of the invention has a reflection structure comprising an input fiber 1 and an output fiber 2 which are fastened by a duplex ferrule 3, a collimating lens 6, and a reflector element 9 for reflecting light. The optical device further comprises a cylindrical lens functioning as a condenser lens 7, and an electro-optical element 8, which is placed near a collection point of the condenser lens 7. Electrodes of the electro-optical element 8 are configured such that the interelectrode distance becomes smaller the closer they are to the collection part.

14 Claims, 7 Drawing Sheets

U.S. PATENT DOCUMENTS

| | | | |
|---|---|---|---|
| 4,918,804 A * | 4/1990 | Bleuel et al. | 29/33 M |
| 5,073,042 A * | 12/1991 | Mulholland et al. | 385/69 |
| 5,076,656 A * | 12/1991 | Briggs et al. | 385/71 |
| 5,192,962 A * | 3/1993 | Nishida et al. | 353/98 |
| 5,335,301 A * | 8/1994 | Newman et al. | 385/75 |
| 5,414,540 A * | 5/1995 | Patel et al. | 349/196 |
| 5,521,997 A * | 5/1996 | Rovenolt et al. | 385/77 |
| 5,557,692 A * | 9/1996 | Pan et al. | 385/11 |
| 5,634,704 A * | 6/1997 | Shikama et al. | 353/31 |
| 5,648,860 A * | 7/1997 | Ooi et al. | 349/10 |
| 5,727,109 A * | 3/1998 | Pan et al. | 385/140 |
| 5,893,635 A * | 4/1999 | Bhattacharya | 362/268 |
| 5,900,977 A * | 5/1999 | Hikmet | 359/497 |
| 5,978,136 A * | 11/1999 | Ogawa et al. | 359/487 |
| 6,173,099 B1 * | 1/2001 | Kiernicki et al. | 385/78 |
| 6,260,974 B1 * | 7/2001 | Koyama | 353/98 |
| 6,276,840 B1 * | 8/2001 | Weiss et al. | 385/59 |
| 6,278,552 B1 * | 8/2001 | Ishihara et al. | 359/619 |
| 6,406,584 B1 * | 6/2002 | Grossman et al. | 156/254 |
| 6,464,362 B1 * | 10/2002 | Sugawara et al. | 353/102 |
| 6,621,533 B2 * | 9/2003 | Slack et al. | 349/5 |
| 6,626,584 B2 * | 9/2003 | Fujita et al. | 385/88 |
| 6,637,892 B1 * | 10/2003 | Okuyama et al. | 353/38 |
| 6,910,810 B2 * | 6/2005 | Mine et al. | 385/89 |
| 6,973,223 B2 * | 12/2005 | Huang et al. | 385/11 |
| 7,014,369 B2 * | 3/2006 | Alcock et al. | 385/57 |
| 7,036,941 B2 * | 5/2006 | Akiyama et al. | 353/102 |
| 7,195,400 B2 * | 3/2007 | Asano et al. | 385/78 |
| 7,301,601 B2 * | 11/2007 | Lin et al. | 349/201 |
| 2002/0041731 A1 * | 4/2002 | Fujita et al. | 385/31 |
| 2002/0093718 A1 * | 7/2002 | Slack et al. | 359/246 |
| 2002/0196816 A1 * | 12/2002 | Shirasaki | 372/20 |
| 2004/0227910 A1 * | 11/2004 | Akiyama et al. | 353/102 |
| 2005/0024879 A1 * | 2/2005 | Takezawa | 362/341 |

FOREIGN PATENT DOCUMENTS

| | | | |
|---|---|---|---|
| JP | 09292543 A * | 11/1997 | |
| JP | 2000-085183 | 3/2000 | |
| JP | 2002195914 A * | 7/2002 | |
| JP | 2003-121807 | 4/2003 | |
| JP | 2003-255287 | 9/2003 | |
| JP | 2003-270603 | 9/2003 | |
| JP | 2004-177639 | 6/2004 | |

* cited by examiner

OPTICAL DEVICE USING VARIABLE POLARIZATION ELEMENT

TECHNICAL FIELD

The present invention relates to an optical device that uses an electro-optical element, is small, can be driven at a low voltage, and can vary the intensity of transmitted light.

BACKGROUND ART

Figure 1:
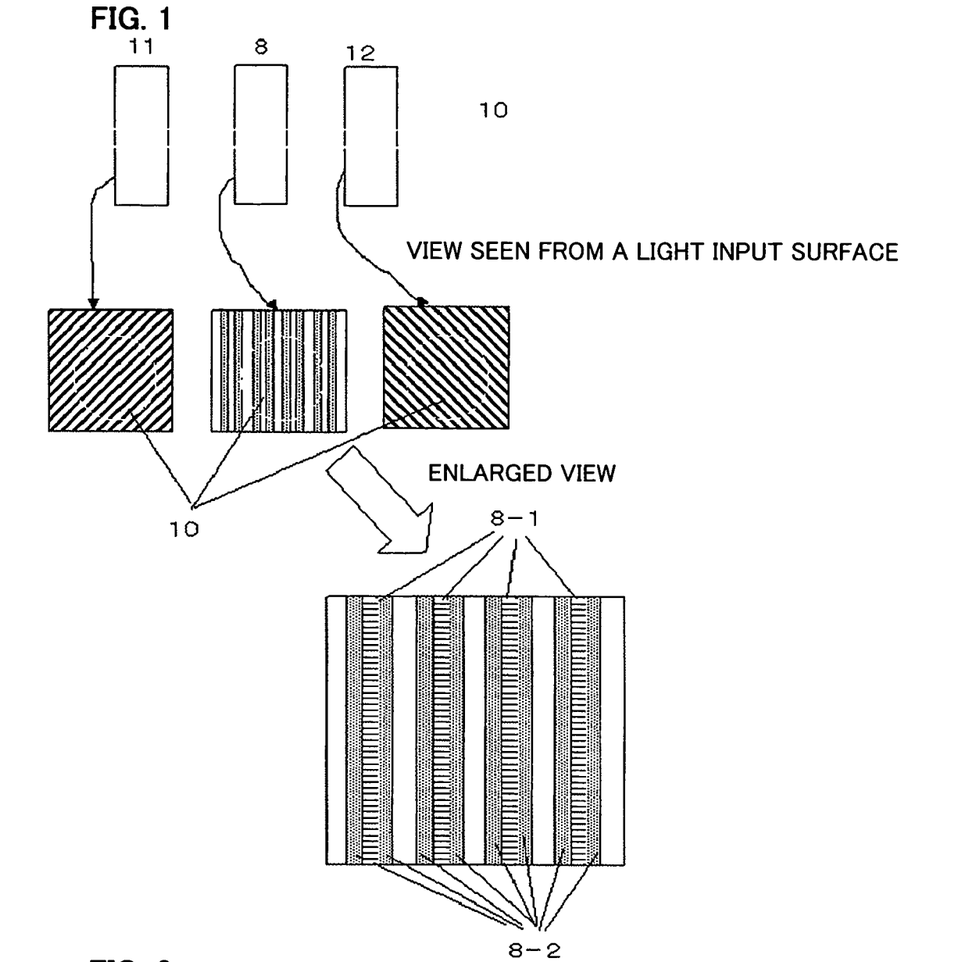
FIG. 1 is a schematic diagram showing a configuration and optical path of an optical shutter of a prior-art embodiment.

An optical shutter described in Non-patent document 1: Ceramics, vol. 26 (1991), No. 2, pp. 139-143 is known as an optical device using the Kerr effect of an electro-optical element, and the device uses PLZT as an electro-optical element. Furuuchi Chemical Corporation sells "PLZT High-speed Optical Shutter," the principle of which is the same as above. Referring to FIG. 1, an outline will be given on the optical shutter. The optical shutter is configured such that an electro-optical element 8 is put between a polarizer 11 and an analyzer 12, the electro-optical element 8 being configured such that a structure of electrode 82-PLZT 81-electrode 82 is repeatedly arranged in an area irradiated with a light beam 10. The polarizer 11 and the analyzer 12 are arranged such that their respective transmitted polarized light beams form an angle of 90 degrees, and the electro-optical element 8 is placed such that the direction of its electrode forms an angle of 45 degrees with the polarizer 11 or with the analyzer 12.

In the following, a principle on which a device having the above structure works as an optical shutter will be described. PLZT, which has the Kerr effect, is an isotropic crystal and is not birefringent when no voltage is applied. Accordingly, in a state where no voltage is applied, linearly polarized light transmitted through the polarizer 11 is not changed in polarization by the electro-optical element 8 comprising PLZT and cannot pass through the analyzer 12, so the shutter becomes the OFF state. On the other hand, when a voltage is applied, the PLZT element having the Kerr effect shows birefringence in the direction of the electric field and in the direction perpendicular thereto. Accordingly, if a voltage is applied which makes a phase difference of 180 degrees between a polarized light component in the direction of the electric field and that in the direction perpendicular thereto (half-wave voltage), linearly polarized light transmitted through the polarizer 11 rotates 90 degrees and becomes capable of passing through the analyzer 12. This is the ON state. As mentioned above, turning on/off the half-wave voltage allows light to be turned on/off.

The product has the plurality of structures of electrode 82-PLZT 81-electrode 82 repeatedly arranged in an area irradiated with light, so that the interelectrode distance can be made smaller than that for a structure of one set of electrode 82-PLZT 81-electrode 82, and the drive voltage is reduced to near 70 V.

Figure 2:
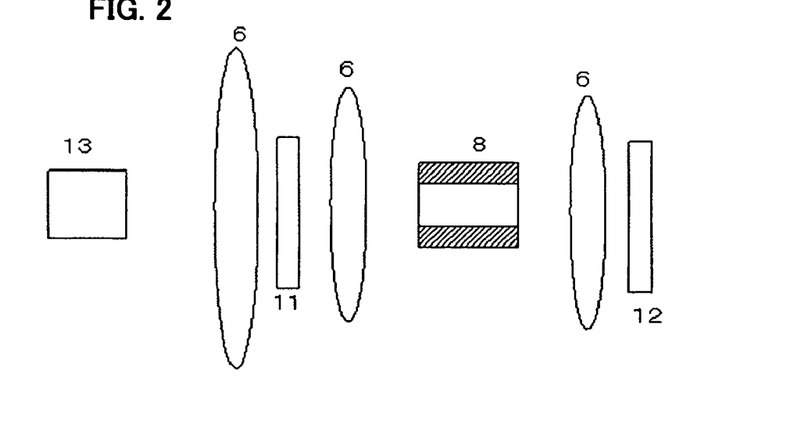
FIG. 2 is a schematic diagram showing a configuration and optical path of an optical shutter of another prior-art embodiment.

A laser recording apparatus of JP-A-2000-85183 has an optical shutter part configured with the polarizer 11, the electro-optical element 8 comprising PLZT, and the analyzer 12, as in the case of the "PLZT High-speed Optical Shutter." A schematic diagram is shown in FIG. 2. In this case, a condenser lens 7 is placed in front of the electro-optical element 8, and the electro-optical element 8 is placed in a focal position of the condenser lens 7. Consequently, an interelectrode distance between parallel electrodes 82 putting PLZT therebetween can be made small, and lower-voltage drive is realized without producing an increase in loss.

DISCLOSURE OF THE INVENTION

Problems to be Solved by the Invention

In the above-mentioned "PLZT High-speed Optical Shutter," the electrode 82 is placed in a light-irradiated part in order to realize lower-voltage drive. Accordingly, the electrode 82 causes a scattering, reflection, and diffraction, and transmission loss becomes large even in an ON state where the half-wave voltage is applied. In addition, a device like the above having a structure of polarizer 11-electro-optical element 8-analyser 12 has disadvantages that it has a large number of parts and it is difficult to downsize. The above-mentioned laser recording apparatus also has problems in size reduction and cost reduction because, as the condenser lens 7 and a lens 6 to collimate are added, it has much more components, even though transmission loss is smaller compared to the "PLZT High-speed Optical Shutter."

Supported by vigorous technological developments, optical communications recently has achieved remarkable progresses such as an expansion in transmission capacity and a realization of flexible networking functions. On the other hand, the demands on optical devices used in transmission equipment are becoming more exacting each year. PLZT-applied optical devices have not a little merit in being applied to optical communications equipment because of their fast responsibility or the like. However, the above-mentioned prior arts have demerits such as large transmission loss, large device size due to the large number of parts, and high cost. In addition, they have a problem of a still large drive voltage.

In view of the above circumstances, the invention downsizes optical devices and reduces the drive voltage thereof without damaging their transmission loss characteristics, by improving the optical structure and PLZT element part of the optical devices.

Means for Solving the Problems

In order to solve the above problems, a variable transmission intensity optical device of the invention has a reflective structure, and its element can be used in a going path and returning path. As a result, the number of parts is reduced by almost half, so that size reduction and low cost is realized. In addition, an electro-optical element is placed near a collection point of a condenser lens, the electro-optical element functioning as a variable polarization element through which a polarization state of transmitted light is changed by applying an external voltage signal thereto. The electro-optical element has an opposite electrode structure in which the interelectrode distance becomes smaller the closer the electrodes are to the collection part, so that the interelectrode distance can be made small, and lower voltage operation can be realized.

The above-mentioned optical device comprises: an input fiber and an output fiber which are fastened by a duplex ferrule; a condenser lens; a reflector element for reflecting light; and a variable polarization element being placed near a collection point of the condenser lens, the variable polarization element for transmitting light collected by the condenser lens and varying polarization of the transmitted light in accordance with an externally inputted signal. The optical device further comprises: a polarization and separation element for transmitting light emitted from the input fiber and polarizing and separating the transmitted light, the polarization and separation element comprising a parallel-plate birefringent crystal; a polarization conversion element for transmitting light emitted from the polarization and separation element and changing polarization of the transmitted light; a lens for collimating light emitted from the polarization conversion element; and a condenser lens for collecting, among components in a wave front of collimated light emitted from the lens, only a component perpendicular to a line connecting a center of an input fiber and a center of an output fiber, and the variable polarization element is placed near a collection point of the lens.

A reason for using here as a condenser lens the condenser lens that collects only one component will be described in the following. In a reflective optical device that uses an input fiber and an output fiber fastened by a duplex ferrule, light outputted from the input fiber is collimated by a collimating lens; the collimated light is reflected by a reflector element and then inputted again into the above collimating lens; and the light is inputted into the output fiber placed in a position different from that for the input fiber. In a case where a condenser lens is inserted into such a reflective optical device system in addition to the collimating lens, it is required that the reflector element be placed at a focus of the condenser lens in order not to produce loss. However, owing to characteristics of lenses, the position where the reflected light is collected again by the collimating lens hardly changes with change of the output angle (reflection angle) at the collection part. That is, even if the angle of the reflector element is adjusted, the input and the output will be at the same fiber. Consequently, in a case where a lens that collects light equally in all directions, such as a spherical lens, is used as the condenser lens as in the case of the laser recording apparatus shown in the Background Art, light cannot be outputted to the output fiber placed in a position different from that for the input fiber. On the other hand, if a condenser lens that collects light in only one direction is used as the condenser lens, it can be realized that a component perpendicular to a direction connecting centers of the input and output fibers is collected alone on the reflector element, and that a component parallel thereto is reflected in a collimated state. The component parallel to the direction connecting the centers of the input and output fibers can be outputted to a position different from that for the input fiber, by adjusting the angle of the reflector element. This means that a duplex reflective device can be realized even when a condenser lens is used, by using a condenser lens for only one direction.

The above contrivance copes with size reduction and lower cost by the "reflective structure," and lower voltage by the "light collection," both at the same time.

Alternatively, in another form of the optical device, a wedge-shaped birefringent crystal can be used instead of the above parallel-plate birefringent crystal.

Still alternatively, in another form of the optical device, a lens can be used both as the condenser lens and as the collimating lens. The multi-use of a lens as the condenser lens and the collimating lens means that the collection point is only on an end face of the input and output fibers, so the device is configured such that the variable polarization element is placed near the end face of the input and output fibers.

In still another form where the reflective system comprises the input and output fibers, the collimating lens, the lens that collects light in only one direction, and the reflector element, the device can be configured such that two variable polarization elements are arranged near two collection points, that is the reflector element and an end face of the input and output fibers.

Since the above optical device is characterized in that the variable polarization element is placed near a collection point, electrodes of the variable polarization element can be shaped such that the interelectrode distance therebetween is smaller the closer they are to and larger the farther they are from the collection point, in accordance with a shape of a light beam to be collected. As a result, such electrodes can realize far lower voltage operation than parallel electrodes, which require to be set in accordance with the largest width of a light beam. The above configuration adds value of far lower voltage operation, in addition to the merits of size reduction, lower cost, and lower voltage which are obtained by the combination of the "reflective structure" and the "light collection."

Incidentally, the expression "near a collection point" described in the invention means a range within plus or minus 1 mm from the collection point.

ADVANTAGES OF THE INVENTION

As described above, the invention offers an optical device that is capable of varying the intensity of transmitted light, such as a variable optical attenuator, an optical shutter, and an optical modulator, and that is smaller and driven at a lower voltage than conventional devices, without damaging the transmission loss characteristics.

BEST MODE OF EMBODYING THE INVENTION

Now, an embodiment of the invention will be described with reference to the drawings.

Figure 3:
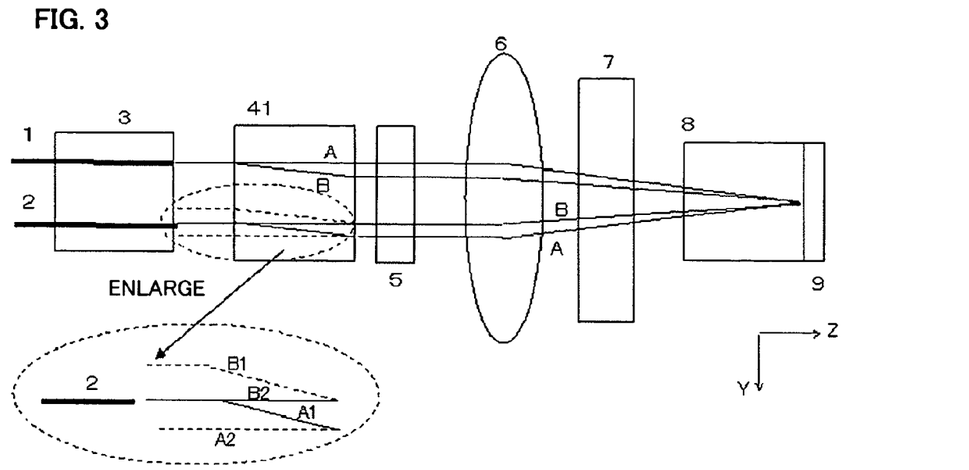
FIG. 3 is a top view showing a configuration of the optical device of the first embodiment of the invention.
Figure 4:
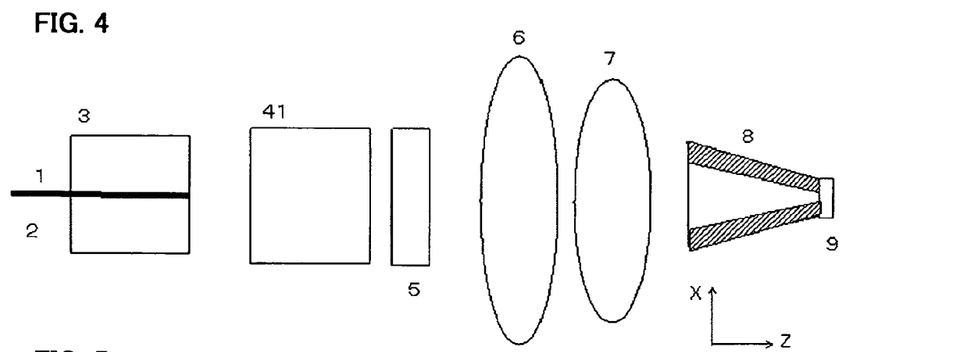
FIG. 4 is a side view showing the configuration of the optical device of the first embodiment of the invention.

FIGS. 3 and 4 are configuration diagrams showing a first embodiment of an optical device consistent with the invention. FIG. 3 is a cross section of the device viewed from above, and FIG. 4 is a cross section viewed from the side. The device comprises: an input fiber 1 and an output fiber 2 which are fastened by a duplex ferrule 3; a parallel-plate birefringent crystal element 41 functioning as a polarization and separation element; a λ/4 plate functioning as a polarization conversion element 5; an aspherical lens functioning as a collimating lens 6; a cylindrical lens functioning as a condenser lens 7 for collecting light in only one direction; an electro-optical element 8 comprising PLZT 81 put between a pair of electrodes 82 and functioning as a variable polarization element; and a total reflection coating 9 functioning as a reflector element evaporated onto the PLZT. Rutile is used as a material of the parallel-plate birefringent crystal element 41, and crystal is used as a material of the λ/4 plate. However, the materials are not limited to them as long as the elements have the same functions. The PLZT 81 put between the pair of electrodes 82 is used as a variable polarization element in this example, but the element is not limited to PLZT or an electro-optical element as long as the element can vary polarization. In addition, the aspherical lens and the condenser lens in use can also be replaced by a GRIN lens or the like.

First, a description will be given of a behavior of the variable polarization element comprising the electro-optical element 8 comprising the PLZT 81 put between the pair of electrodes 82.

When PLZT is used as a variable polarization element, it is desirable that the Kerr effect, which is a quadratic electro-optic effect, is large. A large Kerr effect means that the Kerr constant is $1 \times 10^{-16}$ $(m/V)^2$ or greater. Among compositions of PLZT expressed by $(Pb_{1-x}, La_x)(Zr_y, Ti_z)_{1-x/4}O_3$, compositions around (x, y, z)=(9, 65, 35) are appropriate. PLZT having a large Kerr effect can have a function to vary polarization by means of a phase difference that occurs between a voltage-applied direction and a direction perpendicular thereto. Though the details will be described later, the phase difference is required to change at least from 0 to 180 degrees in order to change the intensity of transmitted light of the optical device from maximum to minimum.

$$\text{Phase difference} = 180/\lambda \times L \times \Delta n$$
$$= 180/\lambda \times L \times 1/2 \times n^3 \times R \times (V/d)^2$$

Figure 5:
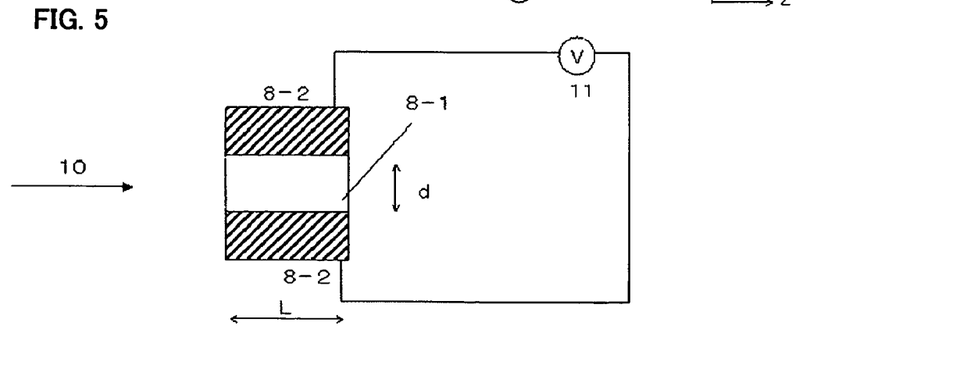
FIG. 5 shows one embodiment of the variable polarization element of the embodiment.
Figure 6:
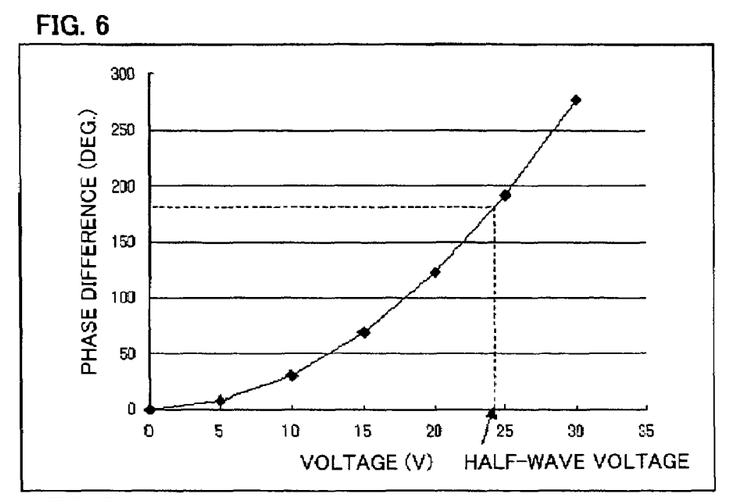
FIG. 6 shows the phase difference (degree) relative to the applied voltage (V) relating to the variable polarization element of the embodiment.

FIG. 5 shows an example of the variable polarization element comprising the electro-optical element 8. The element is configured such that the PLZT 81 is put between the electrodes 82 which are parallel to each other. When an input light beam wavelength is λ; an applied voltage is V; the refractive index of the PLZT is n; the Kerr constant of the PLZT is R; the interelectrode distance is d; and a PLZT element length is L, a phase difference caused by a transmission through the PLZT element and occurring between a polarized light component parallel to the electric field and a polarized light component perpendicular thereto can be described as follows. FIG. 6 shows relation between a phase difference and an applied voltage in a case where λ=1.55 μm, n=2.5, R=8×10$^{-16}$ (m/V)$^2$, the interelectrode distance d is 60 μm, and the PLZT element length L is 0.8 mm, the phase difference being between a polarized light component parallel to the electric field and a polarized light component perpendicular thereto. The half-wave voltage at which the phase difference becomes 180 degrees is about 24 V.

Figure 7:
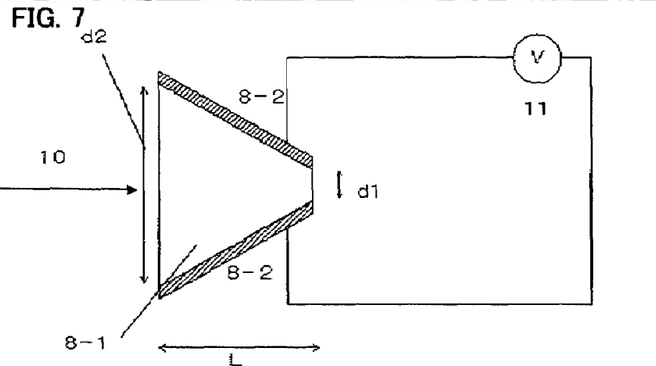
FIG. 7 shows another embodiment of the variable polarization element of the embodiment.

FIG. 7 is a configuration diagram showing an example of another form of the variable polarization element. The element comprises an electro-optical element 8 having V-shaped electrodes 82, the interelectrode distance between which is made small near a focus and larger the farther they are from the focus. When a wide mouth d2 is 60 μm; a narrow mouth d1 is 30 μm; and a PLZT element length L is 1 mm, the electrode stucture can apply an electric field to a light beam more efficiently than that of the embodiment of FIG. 5, so that the half-wave voltage can be reduced to near 16 V.

Figure 8:
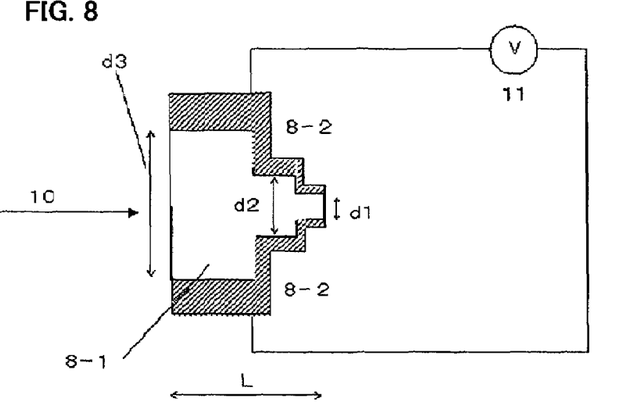
FIG. 8 shows another embodiment of the variable polarization element of the embodiment.

FIG. 8 is a configuration diagram showing an example of still another form. It is configured such that electrodes 82 are step-shaped to change the interelectrode distance. The effect on realizing low voltage operation depends on the number of steps. When the configuration is three-step as shown in FIG. 8 and when a wide mouth d3 is 60 μm; a middle part d2 is 40 μm; and a narrow mouth d1 is 30 m, the half-wave voltage is near 17 V, and thus a low voltage that is almost the same as that of the example of FIG. 7 is enabled.

Now, referring to FIGS. 3, 4, 9, and 10, the first embodiment of the optical device using the above-mentioned variable polarization element will be described as to its optical path from the input fiber 1 to the output fiber 2 and principle of varying the intensity of transmitted light. A light beam emerging from the input fiber 1 enters the parallel-plate birefringent crystal element 41 comprising rutile, and is polarized and separated into a linearly polarized light A oscillating in the x direction (ordinary ray) and a linearly polarized light B oscillating in the y direction (extraordinary ray). The two polarized and separated light beams are transmitted through the λ/4 plate comprising crystal and functioning as the polarization conversion element 5, so that they are converted into circularly polarized light beams rotating in directions opposite to each other. The two light beams are transformed, by the aspherical lens functioning as the collimating lens 6, into collimated light beams whose angles of emergence are different from each other, and enter the cylindrical lens functioning as the condenser lens 7. From the cylindrical lens emerge the two light beams A and B, whose components perpendicular to the direction of the polarization and separation (the x direction in FIG. 4) are only collected, and the light beams enter the electro-optical element 8 comprising the PLZT 81 put between the electrodes 82. The structure of the electro-optical element 8 is any one of those shown in FIGS. 5, 7, and 8, where an anti-reflection coating (AR coating) is applied to one surface of the electro-optical element 8 and a highly reflective coating (HR coating) is applied to the opposite surface. Consequently, the light beams inputted into the electro-optical element 8 through the AR-coated surface are reflected on the HR-coated surface 9, thus go and return through the electro-optical element 8, and emerge again through the AR-coated surface. Alternatively, an AR coating may be applied instead of the HR coating and another separate HR element may be placed close thereto. The two light beams emerging from the PLZT element 8 are changed in their polarization states in accordance with a voltage applied to the electro-optical element 8. The two light beams are transformed back into collimated light by the cylindrical lens functioning as the condenser lens 7, and then again pass through the aspherical lens functioning as the collimating lens 6 and the parallel-plate birefringent crystal element 41, s0 that an extraordinary ray component in the light beam A (A1) and an ordinary ray component in the light beam B (B2), which are in the parallel-plate birefringent crystal element 41, are collected toward the output fiber 2 fastened by the duplex ferrule 3 at a position 250 μm apart from the input fiber 1.

Figure 9:
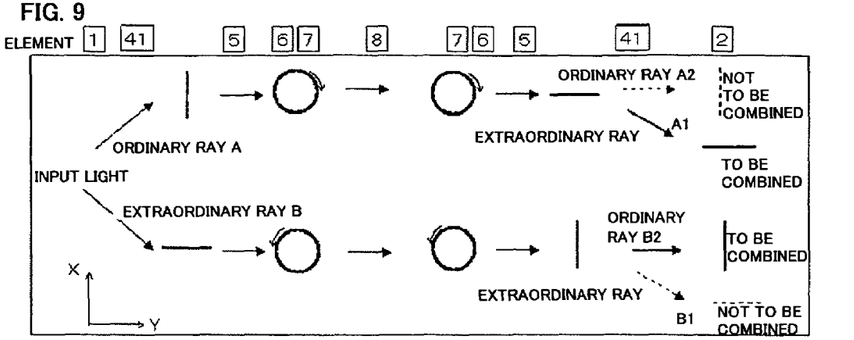

Referring to FIG. 9, a description will be given next of a behavior of a polarization state of a light beam for a case where no voltage is applied. When no voltage is applied, the PLZT 81 is not birefringent, and therefore there is no change in a polarization state from input light to output light. Consequently, the light beams A and B transmitted through the λ/4 plate remain the same as to their circular polarization after passing through the electro-optical element 8, and the light beams again pass through the λ/4 plate, so that the light beam A is converted into linearly polarized light in the y direction and the light beam B is converted into linearly polarized light in the x direction. The light beam A, which is the linearly polarized light in the y direction, is refracted as an extraordinary ray (A1) by the parallel-plate birefringent crystal element 41, and the light beam B, which is the linearly polarized light in the x direction, is refracted as an ordinary ray (B2). Accordingly, if the output fiber 2 is placed in a position shown in FIG. 3, both of the light beams can be combined, and therefore can be combined almost without loss.

Figure 10:
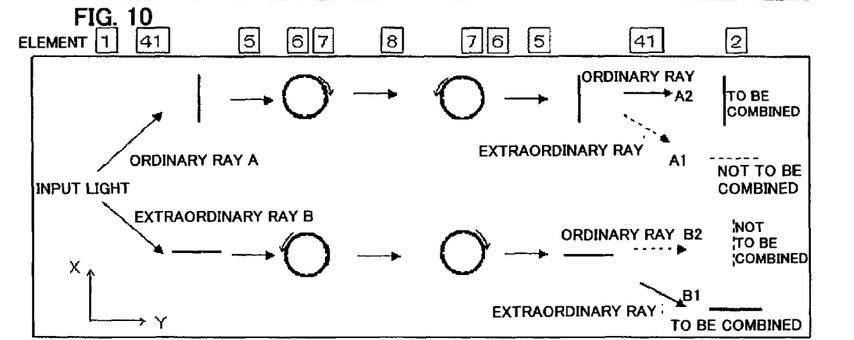
FIG. 10 is a principle illustration showing polarization states of transmitted light for a case where the optical device of the embodiment is OFF.

Now, referring to FIG. 10, a description will be given of a behavior of a polarization state of a light beam for a case where the half-wave voltage is applied. The circularly polarized light A and B passing through the λ/4 plate go and return through the electro-optical element 8, so that a phase difference of 180 degrees occurs between the x-direction component and the y-direction component of each of the light beams. For this reason, each of the light beams becomes a circularly polarized light rotating in an opposite direction to when it is inputted. The light beams emitted from the electro-optical element 8 pass through the λ/4 plate, and then the light beam A is converted into linearly polarized light in the x direction and the light beam B is converted into linearly polarized light in the y direction. The light beam A, which is the linearly polarized light in the x direction, is refracted as an ordinary ray (A2) by the parallel-plate birefringent crystal element 41, and the light beam B, which is the linearly polarized light in the y direction, is refracted as an extraordinary ray (B1). Since the output fiber 2 is placed in the position to combine A1 and B2 as shown in FIG. 3, both of the light beams A2 and B1 are not combined. Consequently, when the half-wave voltage is applied, the device becomes the OFF state where no light beam is outputted.

Figure 11:
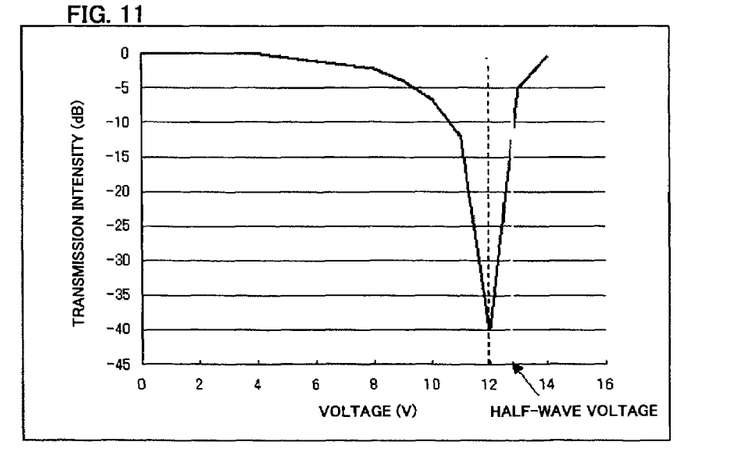
FIG. 11 shows the transmission intensity (dB) relative to the applied voltage (V) of the optical device of the embodiment.

When a voltage between 0 V and the half-wave voltage is applied, the intensity ratio between the to-be-combined component light beam A1 and the not-to-be-combined component light beam A2 and the intensity ratio between the to-be-combined component light beam B2 and the not-to-be-combined component light beam B1 vary depending on the applied voltage. Accordingly, the amount of light to be transmitted to the output fiber 2 can be varied. FIG. 11 shows how the amount of transmitted light changes when a voltage is applied to the optical device of the example. The structure of the PLZT and electrodes of the electro-optical element 8 is like FIG. 7, where the PLZT length L is 0.8 mm; the interelectrode distance of the narrow mouth d1 is 30 µm; and the wide mouth d2 is 60 µm. Since the light beam goes and returns through the electro-optical element, the half-wave voltage is reduced to 12 V. The amount of transmitted light is smallest at the half-wave voltage, so varying the voltage freely between 0 and 12 V allows the optical device of the example to function as a variable optical attenuator. As transmittance can be controlled freely, the device can be used as an output waveform generator. In addition, turning on/off a voltage of 12 V allows the device to also function as an optical shutter. Moreover, forming a signal by repeatedly turning on/off an appropriate voltage between 0 and 12 V allows the device to also function as an optical intensity modulator.

Alternatively, using a λ/2 plate instead of the λ/4 plate as the polarization conversion element 5 allows a voltage versus transmitted light intensity characteristic that the intensity of transmitted light is smallest at 0 V and becomes larger according to the applied voltage.

Figure 12:
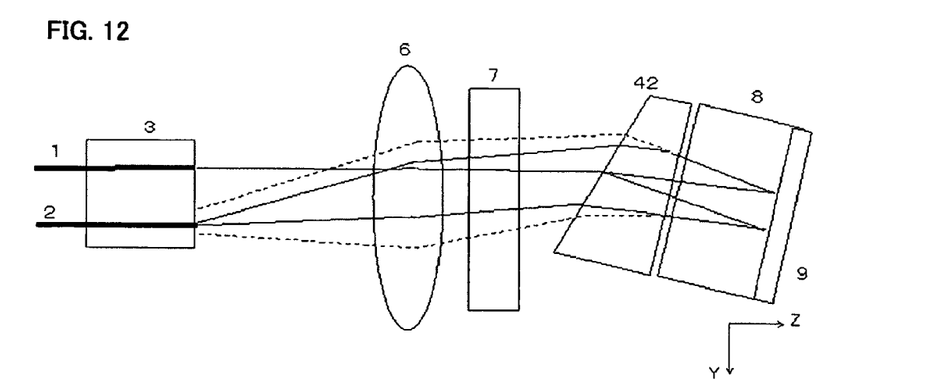
FIG. 12 is a top view showing a configuration of the optical device of the second embodiment of the invention.
Figure 13:
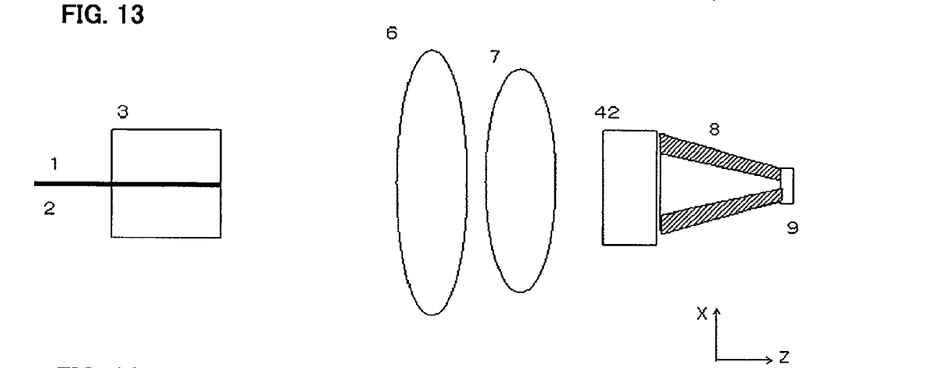
FIG. 13 is a side view showing the configuration of the optical device of the second embodiment of the invention.
Figure 14:
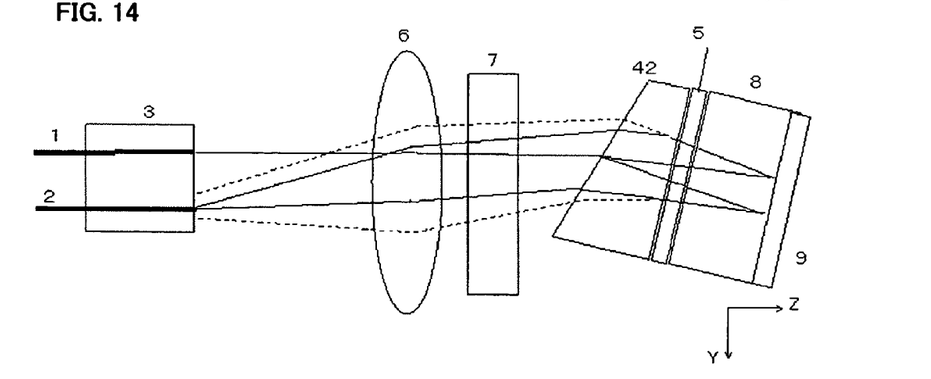
FIG. 14 is a top view showing a configuration of the optical device similar to the second embodiment of the invention.
Figure 15:
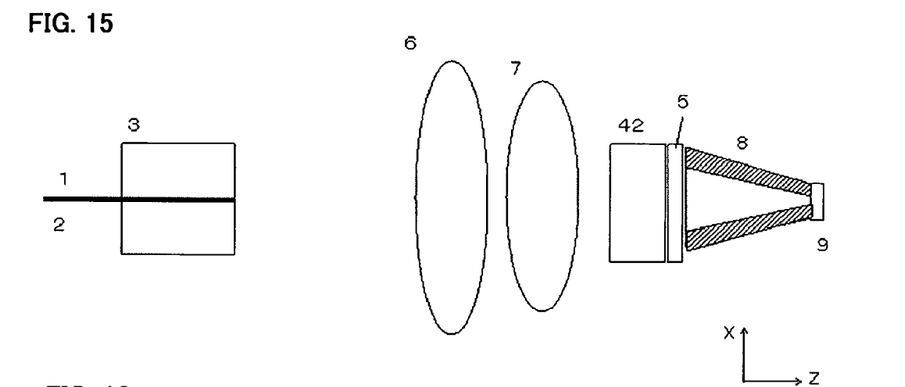
FIG. 15 is a side view showing the configuration of the optical device similar to the second embodiment of the invention.

A second embodiment of the invention is shown in FIGS. 12 and 13. FIG. 12 is a cross section of the device viewed from above, and FIG. 13 is a cross section viewed from the side. The device performs polarization and separation by means of a wedge-shaped birefringent crystal element 42 instead of a parallel-plate birefringent crystal element. In this example, the shape of the electro-optical element 8 is the same as that of the example in FIG. 7. Alternatively, the shape may be that of the example shown in FIG. 5 or 8. In contrast to the parallel-plate birefringent crystal element, the wedge-shaped birefringent crystal element 42 is placed between the condenser lens 7 comprising the cylindrical lens and the electro-optical element 8. The above example has a characteristic that attenuation is largest at 0V. Alternatively, the device can have a characteristic that attenuation is smallest at 0 V, by inserting the polarization conversion element 5, such as a 45-degree Faraday rotator or λ/4 plate, between the wedge-shaped birefringent crystal element 42 and the electro-optical element 8 as shown in FIGS. 14 and 15.

Figure 16:
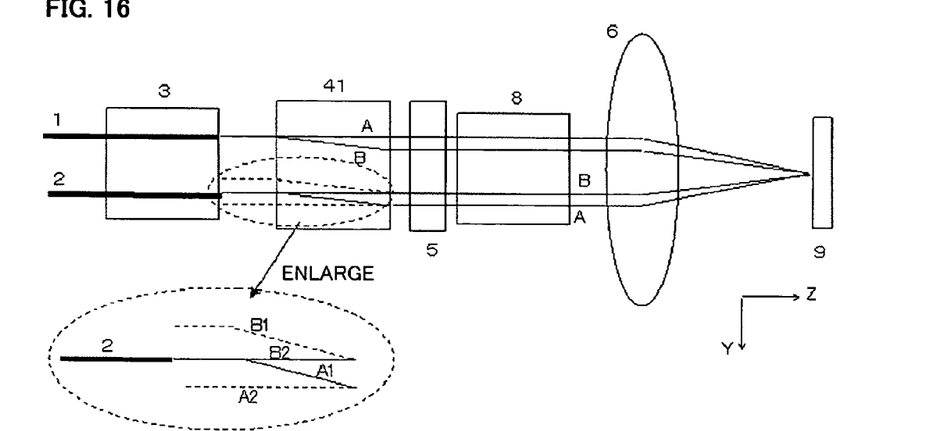
FIG. 16 is a top view showing a configuration of the optical device of the third embodiment of the invention.
Figure 17:
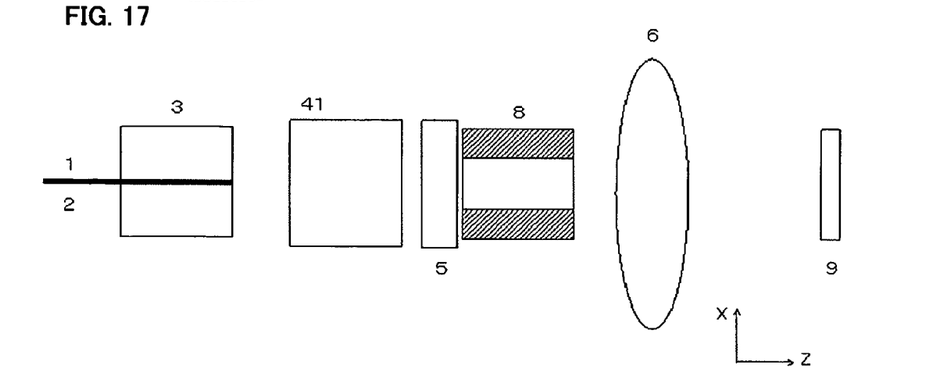
FIG. 17 is a side view showing the configuration of the optical device of the third embodiment of the invention.

In addition, a third embodiment is shown in FIGS. 16 and 17. FIG. 16 is a cross section of the device viewed from above, and FIG. 17 is a cross section viewed from the side. The electro-optical element 8 is placed near a focal position of an aspherical lens functioning as the collimating lens 6, that is, near an end face of the input fiber 1 and output fiber 2. A lens is thereby used both as the condenser lens and as the collimating lens, and thus the number of parts is reduced. This is a feature of the embodiment. In order to prevent loss from occurring, it is required that a collection point of the collimating lens 6 be on the end face of the fibers, and that the parallel-plate birefringent crystal element 41 and the polarization conversion element 5 comprising the λ/4 plate be inserted between the end face of the fibers and the electro-optical element 8. For this reason, the electro-optical element 8 is placed in a position apart from the focal position of the collimating lens 6, which also has the function of the condenser lens. The interelectrode distance therefore becomes relatively large, which is a little disadvantageous for lower voltage operation. However, it is advantageous in terms of the low parts count and the simple structure, and therefore the structure is advantageous for realizing lower cost.

Figure 18:
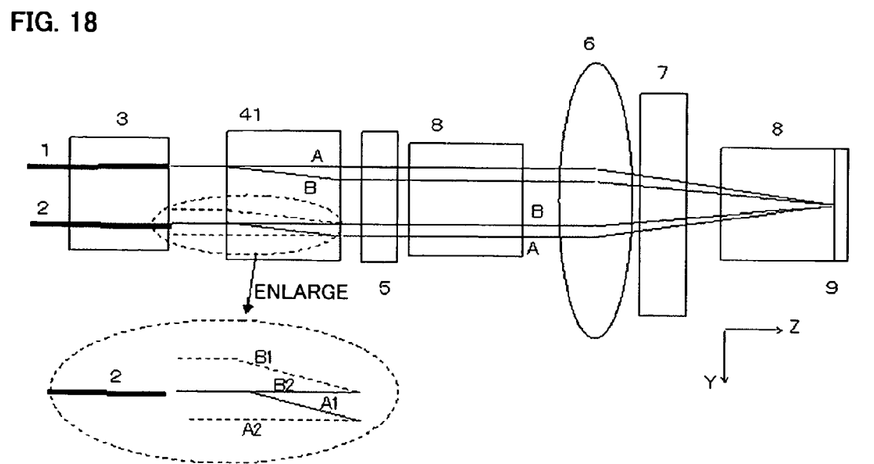
FIG. 18 is a top view showing a configuration of the optical device of the fourth embodiment of the invention.
Figure 19:
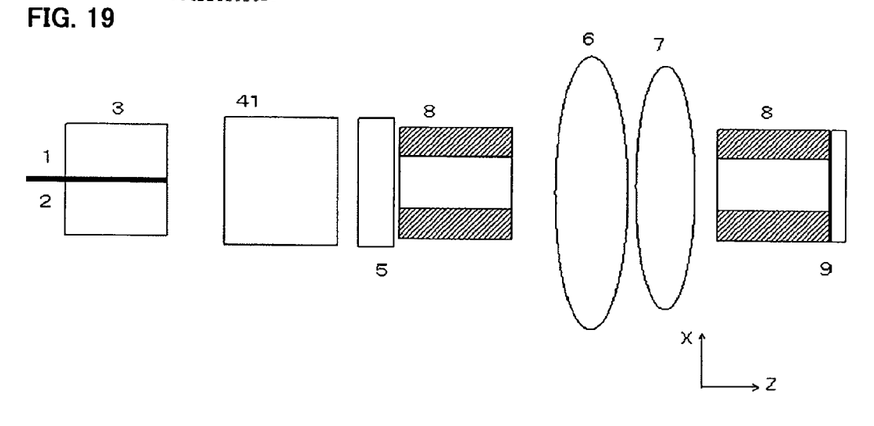
FIG. 19 is a side view showing the configuration of the optical device of the fourth embodiment of the invention.

As further shown in FIGS. 18 and 19 as a fourth embodiment, a combination system of the examples shown in FIGS. 3 (or 4) and 16 (or 17) is workable. In this example, the effective length of the electro-optical element 8 is about double that in FIG. 3 (or 4) or 16 (or 17), and therefore the effect on realizing lower voltage operation is about 1/v2 times. The number of the electro-optical element 8 becomes two, which is a cost-increasing factor. However, the structure is advantageous for realizing lower voltage operation.

As in the case of the example shown in the above FIG. 3 (or 4), the optical devices shown in FIGS. 12 to 19 can function as a variable optical attenuator, an optical shutter, or an optical modulator, according to the method of voltage application.

In the optical device examples shown in the above FIGS. 3, 4, and 12 to 19, the focal length of the aspherical lens functioning as the collimating lens 6 is 6 mm, and the focal length of the cylindrical lens functioning as the condenser lens 7 is 4 mm. The device uses as the electro-optical element 8 comprising PLZT the element shown in the example of FIG. 5, 7, or 8. The input fiber 1 and the output fiber 2 are both singlemode fibers. Alternatively, they may be multimode fibers or polarization maintaining fibers.

The invention is not limited to the above-described embodiments, and can be embodied in modifications falling within the scope not departing from the spirit of the invention.

INDUSTRIAL APPLICABILITY

The invention can realize a variable optical attenuator, an optical shutter, and an optical modulator, and can therefore be used as optical communications equipment.

BRIEF DESCRIPTION OF THE DRAWINGS

FIG. 9 is a principle illustration showing polarization states of transmitted light for a case where the optical device of the embodiment is ON;

DESCRIPTION OF THE SYMBOLS

1: input fiber
2: output fiber
3: duplex ferrule
41: parallel-plate birefringent crystal element
42: wedge-shaped birefringent crystal element
5: polarization conversion element
6: collimating lens
7: condenser lens
8: electro-optical element
81: PLZT
82: electrode
9: reflection coating
11: polarizer
12: analyzer

The invention claimed is:

1. An optical device, comprising:
a polarization and separation element;
a one-direction condenser lens which collects only one direction component of light among two direction components of light perpendicular to each other, and which does not collect the other direction component of light;
a reflector element; and
a variable polarization element having opposite electrodes, the variable polarization element for transmitting light collected by the one-direction condenser lens and varying polarization of the transmitted light in accordance with an externally inputted signal,
wherein the reflector element is arranged in one direction of the variable polarization element while the polarization and separation element and the one-direction condenser lens are arranged in the other direction of the variable polarization element.

2. The optical device according to claim 1, wherein the reflector element is arranged near a collection point of the one-direction condenser lens.

3. The optical device according to claim 1, wherein the polarization and separation element comprises a parallel-plate birefringent crystal.

4. The optical device according to claim 1, wherein the polarization and separation element comprises a wedge-shaped birefringent crystal.

5. The optical device according to claim 1, wherein the variable polarization element and the reflector element are in close contact with each other.

6. The optical device according to claim 1, wherein the variable polarization element is configured such that an interelectrode distance between the opposite electrodes becomes smallest near a collection point of the one-direction condenser lens.

7. The optical device according to claim 6, wherein the interelectrode distance between the opposite electrodes becomes larger the farther they are from the nearness of the collection point.

8. The optical device according to claim 1 comprising a first variable polarization element between the polarization and separation element and the one-direction condenser lens and a second variable polarization element, which is the variable polarization element, between the one-direction condenser lens and the reflector element.

9. An optical device, comprising:
an input optical fiber and an output optical fiber which are fastened by a duplex ferrule;
a polarization and separation element;
a one-direction condenser lens which collects only one direction component of light among two direction components of light perpendicular to each other, and which does not collect the other direction component of light;
a reflector element; and
a variable polarization element having opposite electrodes, the variable polarization element for transmitting light collected by the one-direction condenser lens and varying polarization of the transmitted light in accordance with an externally inputted signal,
wherein the reflector element is arranged in one direction of the variable polarization element while the polarization and separation element and the one- direction condenser lens are arranged in the other direction of the variable polarization element.

10. The optical device according to claim 9, wherein the reflector element is arranged near a collection point of the one-direction condenser lens.

11. The optical device according to claim 9, wherein the polarization and separation element comprises a parallel-plate birefringent crystal.

12. The optical device according to claim 9, wherein the polarization and separation element comprises a wedge-shape birefringent crystal.

13. The optical device according to claim 9, wherein the variable polarization element is configured such that an interelectrode distance between the opposite electrodes becomes smallest near a collection point of the one-direction condenser lens.

14. The optical device according to claim 13, wherein the interelectrode distance between the opposite electrodes becomes larger the farther they are from the nearness of the collection point.

* * * * *

UNITED STATES PATENT AND TRADEMARK OFFICE
CERTIFICATE OF CORRECTION

| | | |
|---|---|---|
| PATENT NO. | : 7,565,040 B2 | Page 1 of 1 |
| APPLICATION NO. | : 11/596277 | |
| DATED | : July 21, 2009 | |
| INVENTOR(S) | : Hiroshi Nagaeda et al. | |

It is certified that error appears in the above-identified patent and that said Letters Patent is hereby corrected as shown below:

In claim 9, column 10, line 41, "one- direction" should read --one-direction--.

In claim 14, column 10, line 60, "nearness" should read --nearness--.

Signed and Sealed this

Twenty-fourth Day of November, 2009

David J. Kappos
*Director of the United States Patent and Trademark Office*